US005600781A

United States Patent [19]

Root et al.

[11] Patent Number: 5,600,781
[45] Date of Patent: Feb. 4, 1997

[54] METHOD AND APPARATUS FOR CREATING A PORTABLE PERSONALIZED OPERATING ENVIRONMENT

[75] Inventors: Kenneth Root; Thomas Willis, both of Portland, Oreg.

[73] Assignee: Intel Corporation, Santa Clara, Calif.

[21] Appl. No.: 651,660

[22] Filed: May 21, 1996

Related U.S. Application Data

[63] Continuation of Ser. No. 315,941, Sep. 30, 1994, abandoned.

[51] Int. Cl.$^6$ ........................................................ G06F 3/14
[52] U.S. Cl. ........................................ 395/326; 345/142
[58] Field of Search .............................. 395/112, 117, 395/155, 156, 157, 158, 159, 160, 161; 364/419.07, 419.13, 419.08, 707; 345/116, 117, 118, 141, 142; 382/187

[56] References Cited

U.S. PATENT DOCUMENTS

| | | | |
|---|---|---|---|
| 4,998,213 | 3/1991 | Suzuki et al. | 395/112 |
| 5,007,003 | 4/1991 | Suzuki et al. | 395/112 |
| 5,027,288 | 6/1991 | Suzuki et al. | 395/117 |
| 5,396,443 | 3/1995 | Mese et al. | 364/707 |
| 5,434,777 | 7/1995 | Luciw | 364/419.13 |
| 5,434,929 | 7/1995 | Beernink et al. | 382/187 |

*Primary Examiner*—Mark R. Powell
*Assistant Examiner*—Ruay Lian Ho
*Attorney, Agent, or Firm*—Blakely, Sokoloff, Taylor & Zafman

[57] ABSTRACT

To operate most effectively, a computer system should be customized for each user that will use the computer system. Specifically, it is desirable to have a computer system that knows exactly how each particular user desires to interact with a computer system. To implements such a system, a set of personalized information that defines how a particular user desires to interact with the computer system is defined. The personalized information for each user is stored on a small portable memory device that is given to the user. When a user wishes to use any computer system compatible with the personalized information system, then the user inserts the small portable memory device containing the personalized information. The personalized information is read into the computer system, and the computer system is then configured using the personalized information.

16 Claims, 6 Drawing Sheets

METHOD AND APPARATUS FOR CREATING A PORTABLE PERSONALIZED OPERATING ENVIRONMENT

This is a continuation of application Ser. No. 08/315,941, now abandoned.

FIELD OF THE INVENTION

The present invention relates to computer user interfaces. Specifically, the present invention relates to a portable personality database that specifies a particular user's personal preferences.

BACKGROUND OF THE INVENTION

Easy to use computer interfaces have greatly expanded the popularity of microcomputers. For example the Apple Macintosh and Microsoft Windows graphical user interfaces have greatly simplified the use of microcomputers such that a whole new class of users now use microcomputers.

To further simplify the use of a computer system, a user interface should adapt itself to the way a particular user works. For example, most people record information by writing down the information using a pen and paper. To adapt to this system of recording information, a number of pen based computer systems have been introduced that allow a user to record information by writing with an electronic pen on a tablet screen. To convert the user's writing into a more convenient form, the computer employs a handwriting recognition algorithm. Examples of computer systems that use handwriting recognition include the Apple Newton personal digital assistant, the Microsoft's Pen Windows Operating System, and the Casio Zoomer® personal digital assistant. Other systems allow a user to speak to the computer and a speech recognition algorithm is used to translate the user's speech into recognized words and commands.

To create user interfaces that are particularly adapted to a user's habits, the user interface software must have information that uniquely identifies and describes the user. For example, a handwriting recognition type of interface must have information about the user's handwriting style. Similarly, a voice recognition user interface must have specific information about the user's voice such as pitch, intonation, and accent. Thus, sophisticated personalized user interfaces require a comprehensive database containing information about the specific user who will be using the user interface.

Computers tend to be expensive pieces of capital equipment. To reduce the amount of money spent on computer equipment, employees are often required to share computer systems among different people. If more than one user uses a particular computer system, an operating system with the personalized user interface must have a personal user interface database for each and every user that may use the computer system. Furthermore, if there are several different computer systems that a user may use, every computer system must contain a copy of that user's personal preferences. It would be desirable to reduce the amount of information stored on shared computer systems.

If a new user starts using a computer system, an entire new personality database must be created for that new user. However, that new user may have already used a computer system in the past with a similar user interface. To reduce the setup time, it would be desirable to have a system to transfer the information containing the user's previous personality file to the new computer system.

SUMMARY AND OBJECTS OF THE INVENTION

It is therefore an object of the present invention to provide a personality database which is easily transportable among computer systems such that once a user sets up their personality profile, that personality profile can easily be transferred from one computer system to another.

It is a further object of the present invention to store a personality database on a small portable memory device such that a user can carry the personality database to where ever the user will be doing work.

It is a further object of the present invention to store a user's handwriting and voice characteristics such that new computer systems can easily adapt to that particular user.

These and other objects are provided by the personality profile database of the present invention. A method for storing information that specifies exactly how a particular user desires to interact with a computer system is disclosed. The information that defines how the user desires to interact with the computer system is stored on a small portable memory device.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

NOTATION AND NOMENCLATURE

Figure 1:
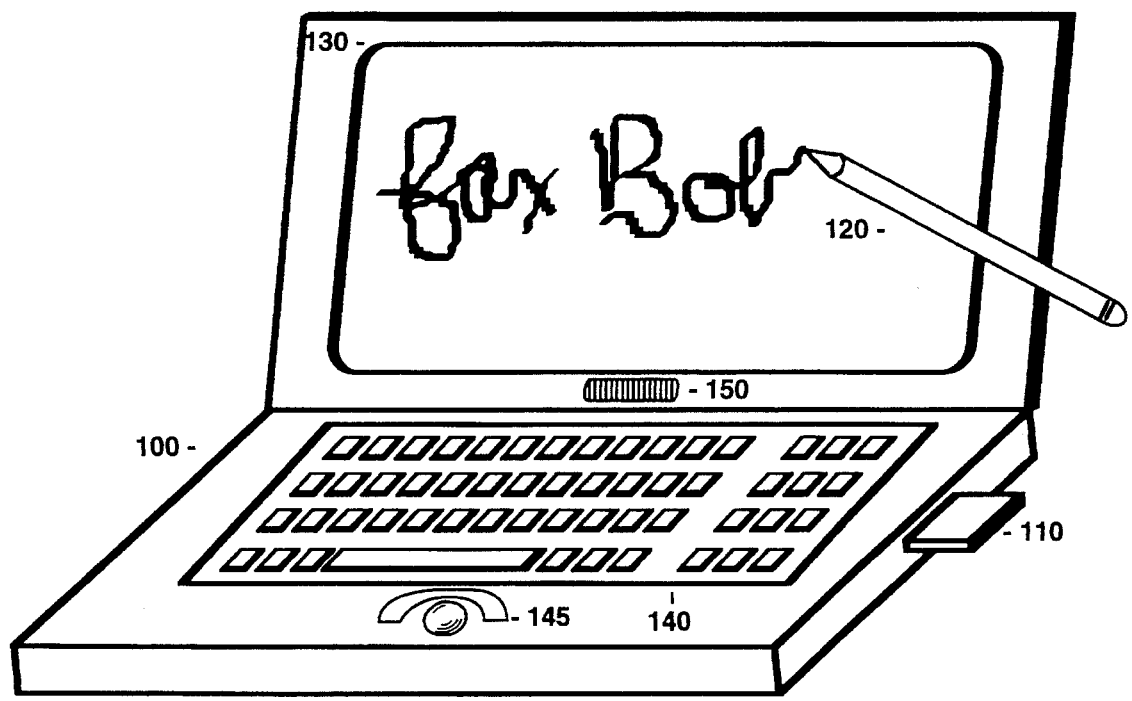
FIG. 1 illustrates a portable computer system with an electronic pen and a PCMCIA card slot.

The detailed descriptions which follow are presented largely in terms of algorithms and symbolic representations of operations within a computer system. These algorithmic descriptions and representations are the means used by those skilled in the data processing arts to convey the substance of their work most effectively to others skilled in the art.

Generally, and within the context of this application, an algorithm is conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, a distinction is maintained between the method operations in operating a computer and the method of computation itself. The present invention relates to method steps for operating a computer in processing electrical or other physical signals (e.g., mechanical, chemical) to generate other desired physical signals.

The present invention also relates to apparatus for performing these operations. This apparatus may be specially constructed for the required purposes, or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION

Methods and apparatus for creating a portable personalized operating environment are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

FIG. 1 illustrates a portable computer system 100. To display information to a user of the portable computer system 100, the portable computer system 100 includes a display screen 130. The display screen may be a flat panel display screen as illustrate in FIG. 1, or any other type of display screen such as a Cathode Ray Tube (CRT). To input information into the portable computer system 100, the portable computer system 100 includes a keyboard 140, a trackball 145, an electronic pen 120, and a microphone 150.

To handle input/output expansion, the portable computer system 100 includes a PCMCIA card slot 110. The PCMCIA card slot 110 in portable computer system 100 is used to connect various external peripherals such as modems, hard disk drives, and flash memory to the portable computer system 100.

To make the portable computer system 100 easy to use, the portable computer system can have a personalized user interface system. A personalized user interface is a computer-user interface that is customized to accommodate the personal preferences of the particular person who will be using the computer system.

An example of a personalized user interface would be a handwriting recognition system. In a handwriting recognition system, the computer system is trained to learn the user's handwriting and thus recognize words written by that particular user. For example, as illustrated in FIG. 1, text can be written on the screen with an electronic pen and a computer will decipher what words have been written on the screen.

Another example of a personalized computer user interface system would be a trained voice recognition system. Trained voice recognition systems recognize the spoken commands and words of a particular user. Trained voice recognition systems must initially be trained by the user that will used the system. The user trains the system by speaking a series of known example words. The trained voice recognition system uses the information obtained during the training to decipher the user's speech.

To reduce capital costs, sophisticated computer systems such as voice recognition computer systems and the portable computer system 100 of FIG. 1 are often shared by multiple users within a company. For example, if the personal computer system 100 of FIG. 1 were used by group of nurses at a hospital to takes notes while on rounds, the personal computer system 100 could be shared by several different nurses that work during different hospital shifts.

Referring to the above example, when the nurses change shifts, the personal computer system 100 must adapt itself to the new nurse that is starting his shift. To adapt itself to the new nurse, the personal computer system 100 must retrieve detailed information from a database that stores information about every user that may use the personal computer system 100.

Simply storing detailed information about several different users is an inadequate solution for a number of reasons. For example, if there are many possible users and a large personality file is required, then a large amount of permanent storage space must be allocated just to store the personality profiles. Furthermore, if there are several shared computer systems, then all of the different personality files must be stored on all the different shared computer systems. Whenever a new computer system is introduced, all the personality profiles must all be copied over into the new computer system. Finally, when person leaves a particular organization, that organization must remove that person's personality database from each of the shared computer systems. When the person starts working at a new organization, that person will have to train the computer system at the new organization and configure the system to the user's preferences again.

The Personality Profile

The present invention discloses a method of providing a simple and transportable personality database for personalized user interfaces. In the present embodiment, a personality profile is stored on a PCMCIA type flash memory card. However, any other portable memory storage format could be used. Furthermore, any other type nonvolatile memory storage device could be used. For example, instead of flash memory, the card could store information using bubble memory, battery backed RAM, holographic memory, or a hard disk drive.

Figure 2:
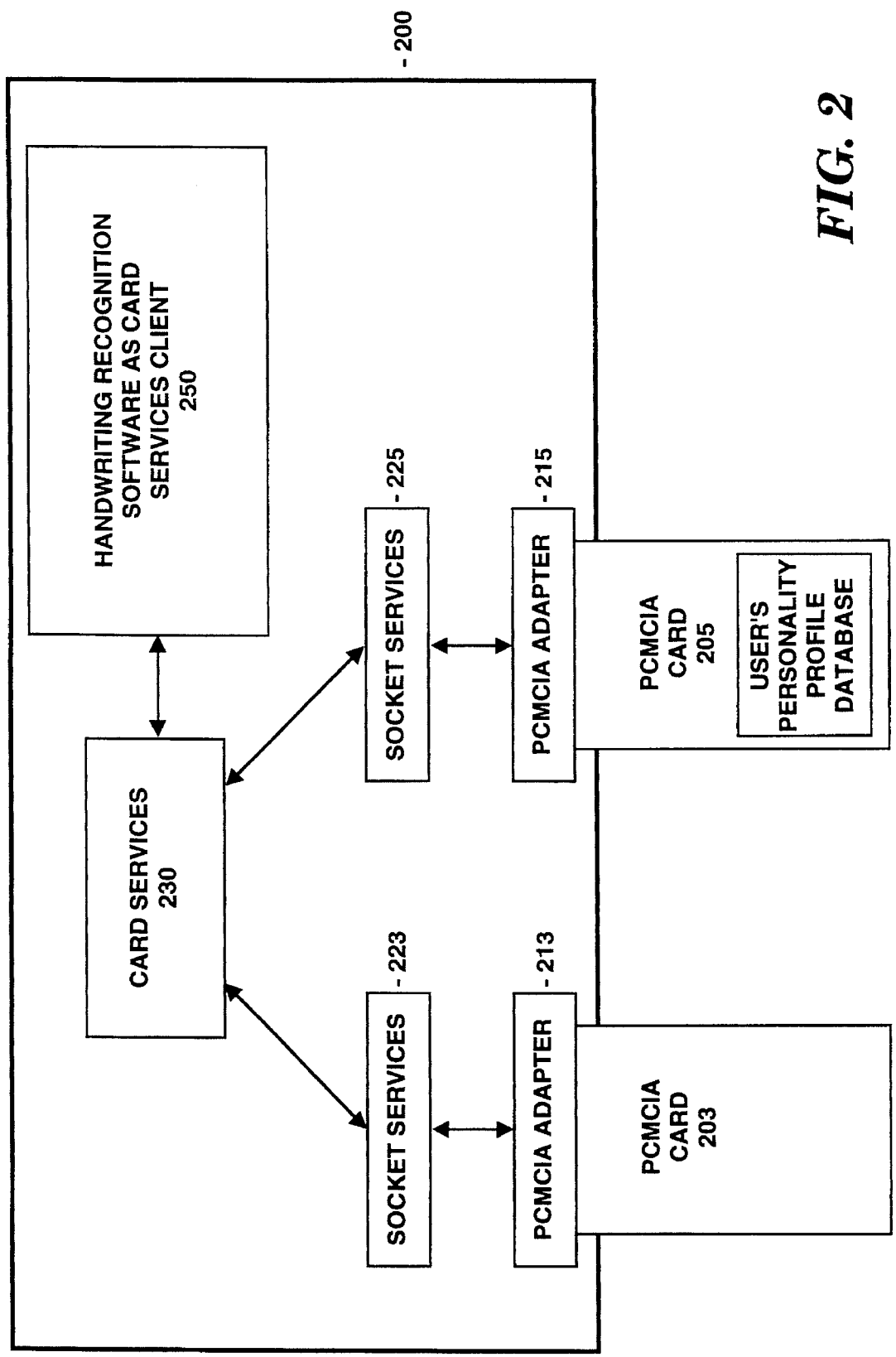
FIG. 2 illustrates a software block diagram whereby handwriting recognition engine access a personality profile stored on a PCMCIA card.

FIG. 2 illustrates a software block diagram of how the personality profile of the present invention is stored with reference to a computer system having external PCMCIA ports. To control the external PCMCIA ports, the computer system 200 includes PCMCIA software. The PCMCIA software consists of PCMCIA socket services layers (223 and 225) and a card services layer 230. The PCMCIA card services layer 230 acts as a software interface for application programs that wish to access PCMCIA cards. The card services layer 230 interacts with PCMCIA cards through PCMCIA socket services layers.

In the computer system 200 of FIG. 2, there are two socket services layers (223 and 225) wherein each socket services layer controls a different PCMCIA card adapter. In FIG. 2, PCMCIA socket services layers 223 and 225 control PCMCIA card adapters 213 and 215, respectively. The PCMCIA card adapters 213 and 215 are the actual physical interfaces for PCMCIA cards 203 and 205. As illustrated in FIG. 2, PCMCIA card 205 contains a user personality profile database. Since the personality profile is stored on a removable PCMCIA memory device, the personality profile can quickly be moved from one computer system to another computer system.

In FIG. 2, a handwriting recognition software package 250 provides an example of a common type of personalized user interface system. To interact with the user personality profile database on the PCMCIA card 205, the handwriting recognition software 250 registers with the card services layer 230. When the handwriting recognition engine 250 registers with the card services layer 230, the handwriting recognition engine 250 should indicate that it wishes to be informed about any new PCMCIA cards that are inserted into the computer system 200.

Using the present invention, if a user wishes to use a computer system using a personalized user interface, the user inserts a card containing the user's personality profile database. When a PCMCIA card is inserted into one of the PCMCIA adapters (213 and 215), the card services layer 230 notifies the handwriting recognition software 250. The handwriting recognition software 250 can then query the PCMCIA card that was inserted to determine whether the card contains a user personality profile database. If the inserted PCMCIA card contains a user personality profile database, the handwriting recognition software 250 can read the specific handwriting recognition parameters from the personality profile database. Such that the computer system 200 is then prepared to accept handwriting from the new user.

Handwriting Recognition Personality Database

Figure 3:
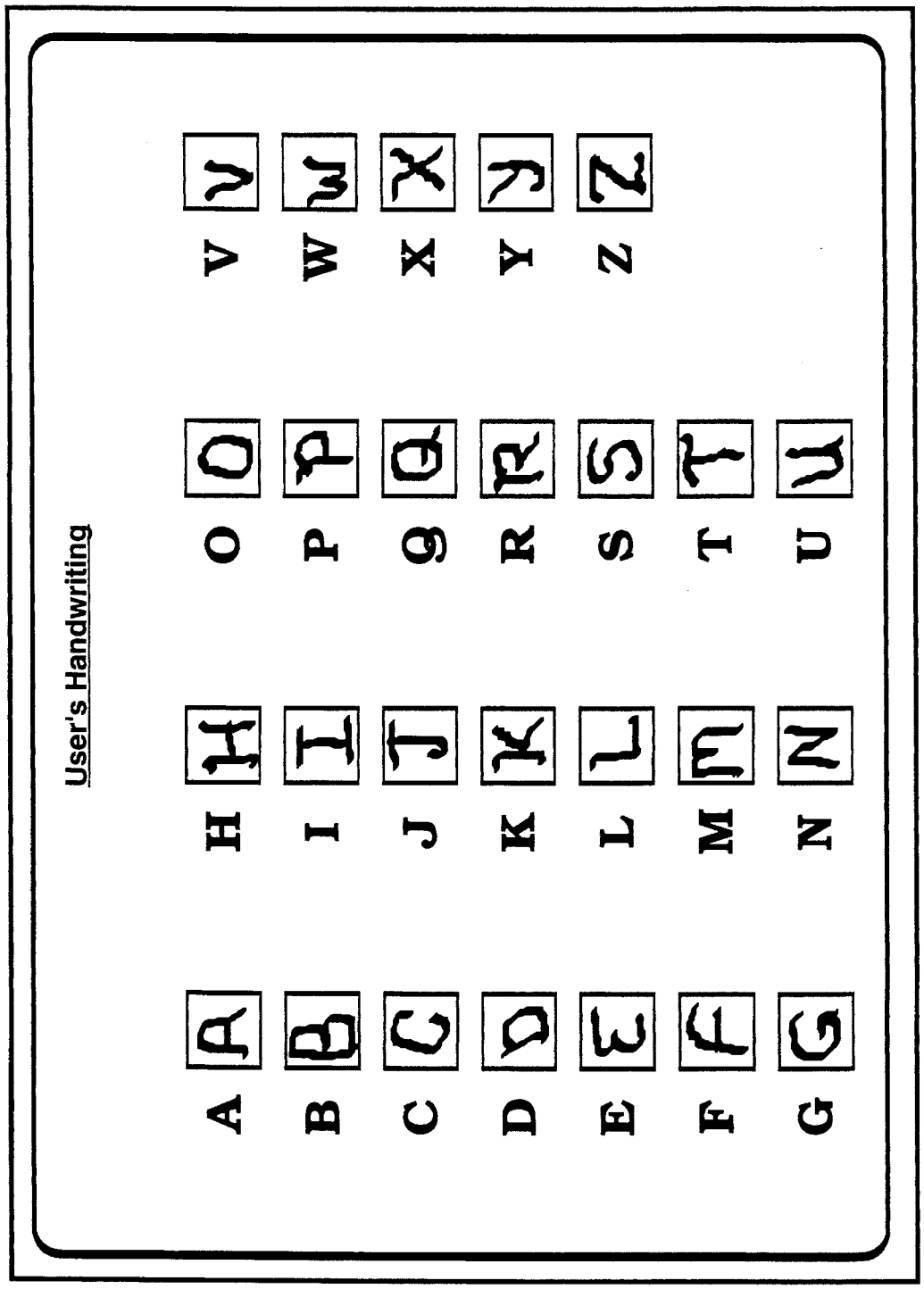
FIG. 3 illustrates an example of a user's handwriting stored in a personality profile.

As previously mentioned, handwriting recognition systems are a common type of user interface that can be personalized for each user in order to function with greater accuracy. As illustrated above, the personality profile database of the present invention is ideal for storing personalized handwriting information. FIG. 3 illustrates a screen display of handwriting information that can be stored in a handwriting database. The information of FIG. 3 consists of the alphabet as written by the user in their own handwriting. A handwriting recognition program can use the information display in FIG. 3 to decipher handwriting.

The handwriting information can be stored in any type of handwriting format. However, in the preferred embodiment, the handwriting information is stored in a standardized magnetic ink format know as the "JOT" format. The JOT format contains rich attributes required to accurately represent digital ink. For example, the JOT format stores pen tip pressure, the timing of each pen stroke, the ordering of the strokes. Additional information about the JOT format can be found in the Jot Ink Specification, 1993, available from the Software Publisher's Association Mobile and Pen special-interest group.

Figure 4:
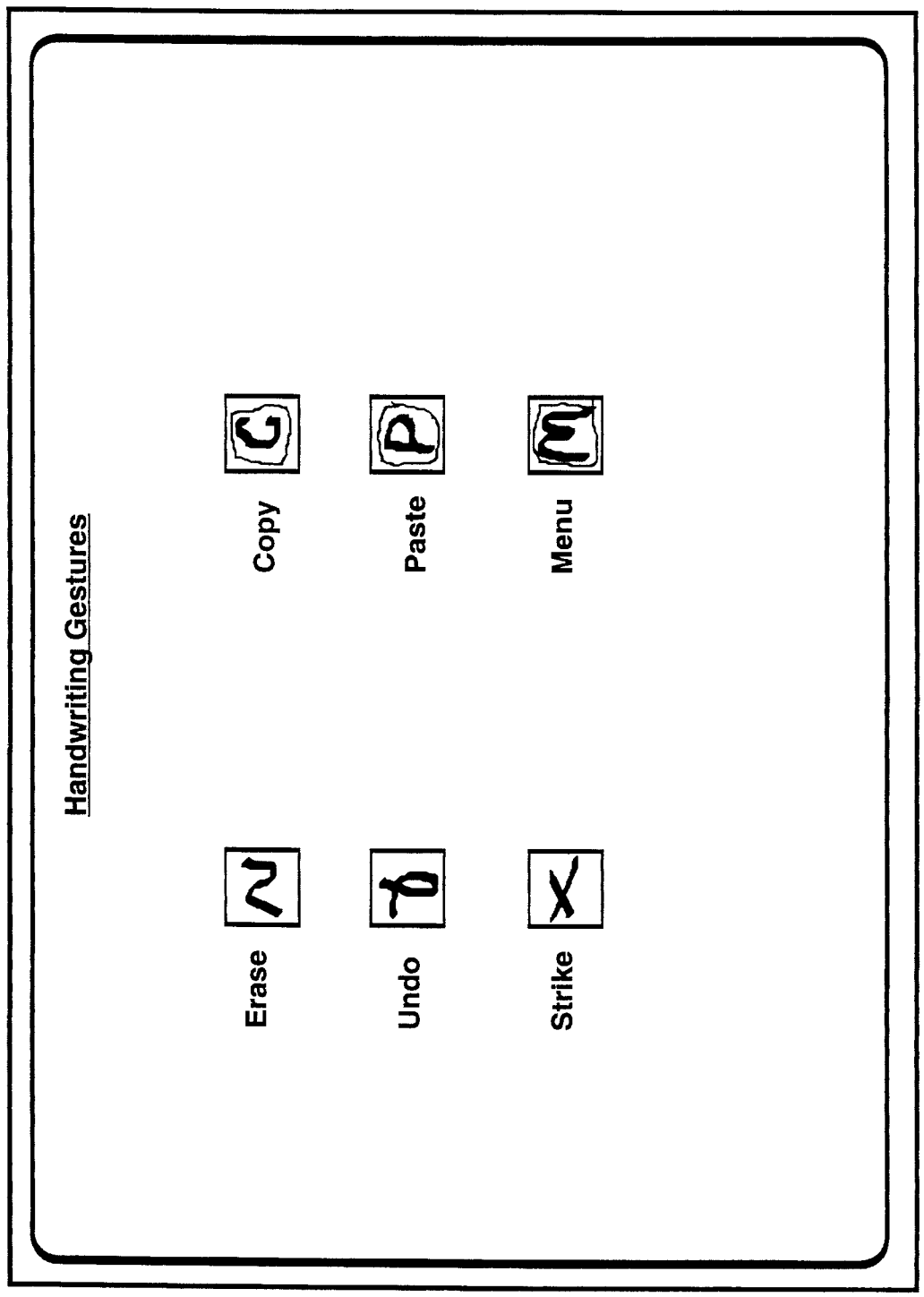
FIG. 4 illustrates and example of six different handwriting gestures that are stored in a user's personality profile.

To supplement the strokes used to create the individual letters of the alphabet, additional information about a user's handwriting can be stored in the personality profile database. For example, referring to FIG. 4, different gestures used to control a program can be stored in the personality profile such that the user can use whichever preferences they are the most comfortable with. As illustrated in FIG. 4, a user can select their own gestures for erase, undo, strike, copy, cut, paste and menu. Any handwriting recognition program or pen based program that is compatible with the personality profile database can use these personalized gestures such that the user will always have a personalized interface to work with that is consistent across all applications and operating systems.

Figure 5:
FIG. 5 illustrates a list of user's writing preferences that can be stored in a user's personality profile.

A user's personal preferences when using a pen can also be stored for handwriting recognition programs. For example, referring to FIG. 5, characteristics of the pen and characteristics of the writer can be stored. For example, the user's desired pen color be selected, as well as the width of the pen. Personalized writer characteristics include whether the writer is left or right handed, and whether the writer will be printing or writing in cursive.

Voice Recognition Characteristics

Another type of user interface that operates best with personalized information is a trained voice recognition user interface. Voice recognition interfaces translate a user's spoken words into commands or words that the computer system can interpret. The most accurate voice recognition programs require that a user train the computer system by speaking a series of known test words to the computer system. The voice recognition system uses the set of known test words to learn the user's particular voice characteristics.

Personality Profile Operation

Figure 6:
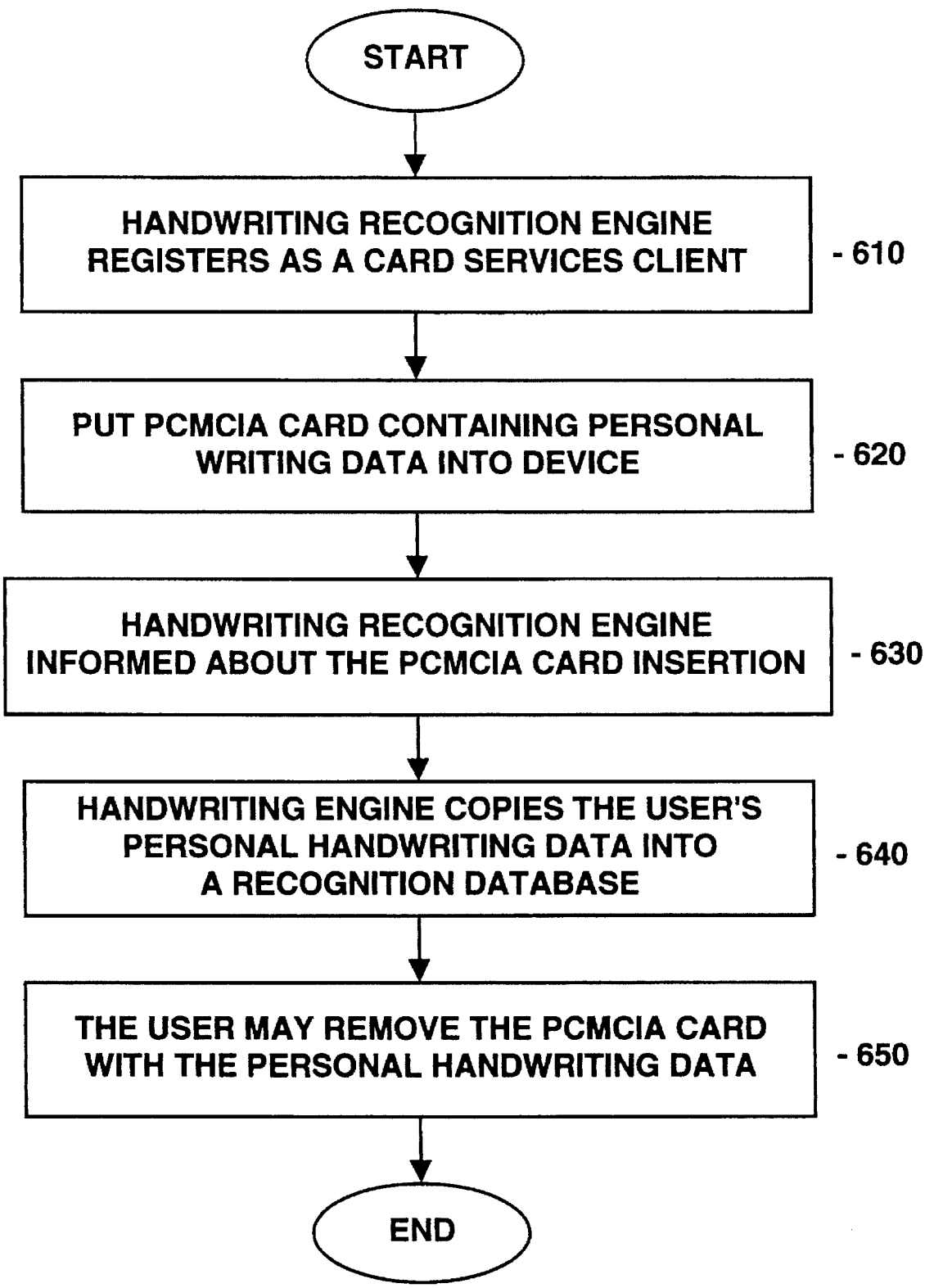
FIG. 6 illustrates a flow diagram listing the steps that are performed when a memory device containing a new personality profile is inserted into a computer system.

FIG. 6 lists how a personality profile on a PCMCIA card is used. Initially the operating system and/or application programs that will use information from the personality profile database will register as a card services client as mentioned in step 610 of FIG. 6. In the example of FIG. 2, the handwriting recognition program 250 registers as a card services client. At a later point, a new user inserts a PCMCIA card containing a personality profile database into the computer system as listed at step 620. When the PCMCIA socket services layer detects that a card has been inserted, the PCMCIA socket services layer informs the card services layer. The card services layer then informs the operating system and/or all the application programs that have registered as card services clients and wish to be informed about PCMCIA card insertion events at step 630. If an inserted PCMCIA card contains a personality profile database, any clients that need information from the personality profile database can read that information from the personality profile database stored on the PCMCIA card as stated in step 640. After all the applications that need information from the personality profile database copy the needed information from the PCMCIA card into local memory, the user may remove the PCMCIA card containing the personality profile database, as listed in step 650. Thus, the PCMCIA card slot is then freed up for other uses.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of customizing a computer system for a specific computer user, said computer system having a processor, a memory and a receptacle for peripheral devices, said method comprising the steps of: defining a set of personalized user interface information that specifies how a particular user wishes to interact with computer systems; storing said set of personalized user interface information on a small portable memory device;

inserting said small portable memory device into said receptacle of said computer system;

informing at least one program executing on said computer system about said portable memory device inserted into said receptacle;

copying said set of personalized user interface information stored on said portable memory device into a local memory of said computer system using said said program executing on said computer system; and automatically configuring said program executing on said computer system to use said personalized user interface information in said local memory of said computer system.

2. The method of customizing a computer system for a specific computer user as claimed in claim 1 wherein said portable memory device comprises a PCMCIA card.

3. The method of customizing a computer system for a specific computer user as claimed in claim 2 wherein said PCMCIA card comprises a flash memory card.

4. The method of customizing a computer system for a specific computer user as claimed in claim 1 wherein said set of personalized user interface information comprising handwriting information for a handwriting recognition program.

5. The method of customizing a computer system for a specific computer user as claimed in claim 4 wherein said handwriting information comprise handwriting stored in the JOT format.

6. The method of customizing a computer system for a specific computer user as claimed in claim 4 wherein said set of personalized user interface information further comprises a set of electronic pen gestures.

7. The method of customizing a computer system for a specific computer user as claimed in claim 1 wherein said set of personalized user interface information comprising voice recognition samples for a voice recognition program.

8. An apparatus for customizing a computer system for a specific computer user, said computer system having a processor and a memory, said apparatus comprising the elements of:

a portable memory device, said small portable memory device storing a set of personalized user interface information; an external receptacle in said computer system, said external receptacle for receiving said small portable memory device;

at least one program running on said computer system; and means for automatically informing said program running on said computer system when said small portable memory device is inserted into said external port;

means for copying said personalized user interface information from said small portable memory device into a local memory in said computer system;

means for configuring said program running on said computer system to use said personalized user interface information in said local memory in said computer system.

9. The apparatus for customizing a computer system for a specific computer user as claimed in claim 8 wherein said portable memory device comprises a PCMCIA card.

10. The apparatus for customizing a computer system for a specific computer user as claimed in claim 9 wherein said PCMCIA card comprises a nonvolatile memory card.

11. The apparatus for customizing a computer system for a specific computer user as claimed in claim 10 wherein said nonvolatile memory card comprises a flash memory card.

12. The apparatus for customizing a computer system for a specific computer user as claimed in claim 9 wherein said PCMCIA card comprises a battery powered memory card.

13. The apparatus for customizing a computer system for a specific computer user as claimed in claim 8 wherein said set of personalized user interface information comprising handwriting information for a handwriting recognition program.

14. The apparatus for customizing a computer system for a specific computer user as claimed in claim 13 wherein said handwriting information comprise handwriting stored in the JOT format.

15. The apparatus for customizing a computer system for a specific computer user as claimed in claim 13 wherein said set of personalized user interface information further comprises a set of electronic pen gestures.

16. The apparatus for customizing a computer system for a specific computer user as claimed in claim 8 wherein said set of personalized user interface information comprising voice recognition samples for a voice recognition program.

* * * * *